United States Patent
Weinstock

(10) Patent No.: US 11,722,655 B2
(45) Date of Patent: Aug. 8, 2023

(54) LOW LATENCY NETWORKING OF PLENOPTIC DATA

(71) Applicant: Soliddd Corp., Brooklyn, NY (US)

(72) Inventor: Neal Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 0 days.

(21) Appl. No.: 17/538,588

(22) Filed: Nov. 30, 2021

(65) Prior Publication Data

US 2023/0171396 A1 Jun. 1, 2023

(51) Int. Cl.
| | |
|---|---|
| H04N 13/383 | (2018.01) |
| H04N 13/282 | (2018.01) |
| H04N 13/167 | (2018.01) |
| H04N 13/194 | (2018.01) |
| H04N 23/63 | (2023.01) |
| H04N 23/957 | (2023.01) |

(52) U.S. Cl.
CPC ......... *H04N 13/383* (2018.05); *H04N 13/167* (2018.05); *H04N 13/194* (2018.05); *H04N 13/282* (2018.05); *H04N 23/63* (2023.01); *H04N 23/957* (2023.01)

(58) Field of Classification Search
CPC ............. H04N 13/383; H04N 5/22541; H04N 5/23293; H04N 13/167; H04N 13/194; H04N 13/282
USPC .......................................................... 348/49
See application file for complete search history.

(56) References Cited

U.S. PATENT DOCUMENTS

| | | | |
|---|---|---|---|
| 9,497,380 B1 * | 11/2016 | Jannard | H04N 13/189 |
| 10,546,518 B2 | 1/2020 | Perreault et al. | |
| 11,169,675 B1 * | 11/2021 | Anvaripour | H04L 51/52 |
| 2003/0108198 A1 * | 6/2003 | Lahiri | G06F 21/84 380/54 |
| 2017/0038590 A1 | 2/2017 | Jepsen | |
| 2017/0124928 A1 * | 5/2017 | Edwin | G09G 5/02 |
| 2017/0200308 A1 | 7/2017 | Nguyen et al. | |
| 2018/0096503 A1 * | 4/2018 | Kaehler | G06V 40/197 |

(Continued)

OTHER PUBLICATIONS

European Patent Office, International Search Report and Written Opinion, dated Mar. 3, 2023, 14 pages.

*Primary Examiner* — Tung T Vo

(74) *Attorney, Agent, or Firm* — Ference & Associates LLC

(57) ABSTRACT

One embodiment provides a method, including: obtaining, using at least one image obtaining sensor of an image capture device, image data; tracking, using a gaze detection sensor, a user's gaze on a display of the image capture device, wherein a plurality of lens tiles are disposed on the display and wherein each of the plurality of lens tiles cover a portion of the display; predicting, using a processor and based on the tracking, a subsequent gaze location on the display that the user's gaze is expected to be directed toward; transmitting, using a processor, additional image data to the display associated with the portion of the plurality of lens tiles the user is currently viewing and the another portion of the display associated with the new set of the plurality of lens tiles; and updating, responsive to identifying that the user's gaze has transitioned to the subsequent gaze location and using the additional image data, the image data associated with the another portion of the display corresponding to the new set of the plurality of lens tiles. Other embodiments are described herein.

16 Claims, 2 Drawing Sheets

(56) References Cited

U.S. PATENT DOCUMENTS

| | | | |
|---|---|---|---|
| 2018/0173303 A1 | 6/2018 | Liu et al. | |
| 2020/0368616 A1* | 11/2020 | Delamont | A63F 13/213 |
| 2020/0394830 A1* | 12/2020 | Choubey | G06T 15/005 |
| 2020/0412864 A1* | 12/2020 | Al Majid | H04L 51/10 |
| 2020/0412975 A1* | 12/2020 | Al Majid | G06N 20/00 |
| 2021/0142443 A1* | 5/2021 | Eble | H04N 21/631 |
| 2021/0173474 A1 | 6/2021 | Sztuk et al. | |

* cited by examiner

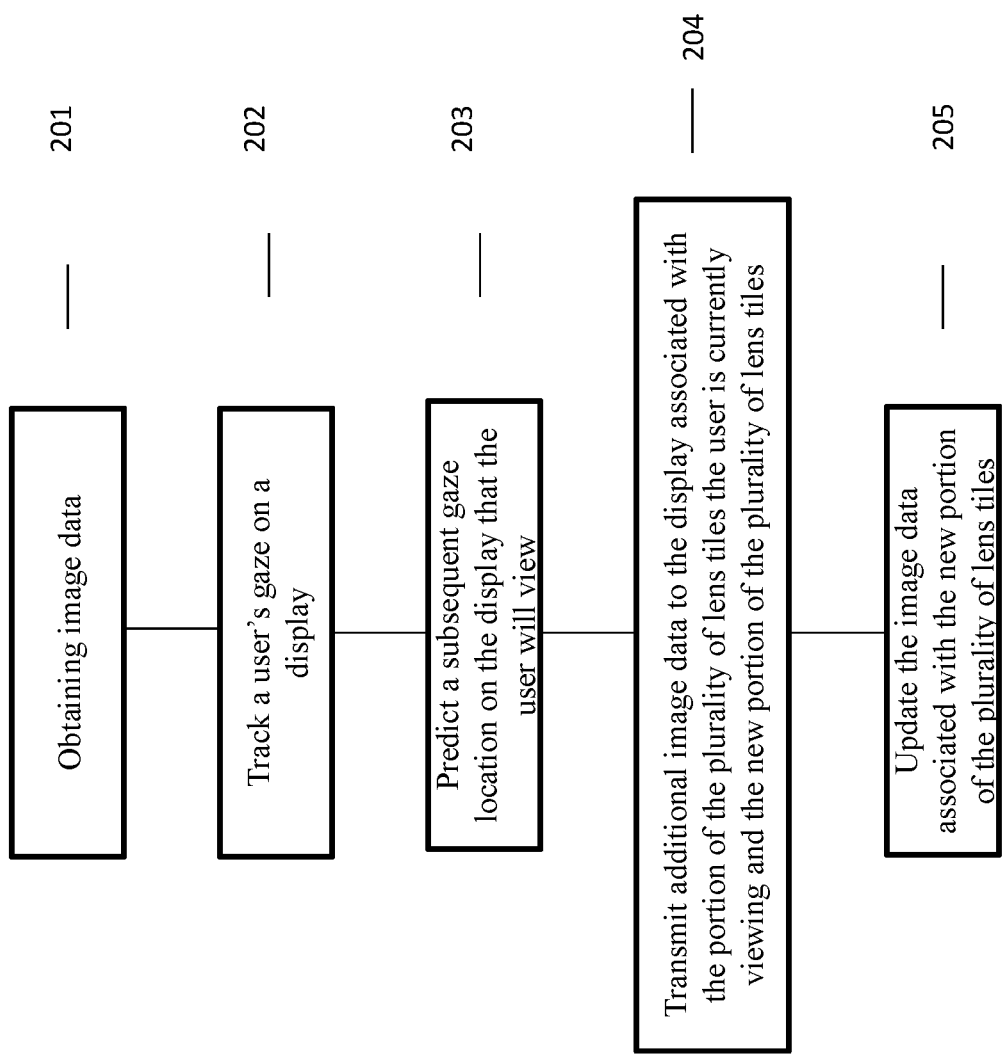

LOW LATENCY NETWORKING OF PLENOPTIC DATA

FIELD OF THE INVENTION

The present invention relates generally to image capture systems, more particularly, to image capture device systems utilizing one or more sensors in combination with a lens array that allows for the capture and display of images along with rapid processing of volumetric and structured data obtained from those images while maintaining low latency and high image quality.

BACKGROUND OF THE INVENTION

Many digital cameras and several kinds of displays employ a two-dimensional lens array in front of the sensor (in a camera) or the display (in a monitor, television, smartphone, near-eye headset, or other kind of display device). The lens array, being a lenticular array, a microlens array, a plenoptic lens, one of multiple elements in a plenoptic or light-field system, or other arrangement, often may be used to focus light on the sensor or from the display such that redundant information, or overlapping images, are captured or displayed by multiple lenslets in the array and thus multiple areas of the underlying sensor or display.

A conventional display or sensor typically consists of an arrangement of thousands of pixels that, when updating at the same rate, provide a single congruent image. Each pixel is located at a specific location of a display or sensor and each location on the display or sensor may be associated with a position provided by the array when obtaining or displaying the image data. Generally, only a small amount of energy and bandwidth is needed to focus light on each pixel of the sensor or from each pixel on the display. However, the focusing of light on the entirety of the pixels through the lens array and presenting the entirety of the image data obtained onto the display may require greater energy expenditure and increased bandwidth consumption, especially as sensor and display resolutions grow ever higher.

Transmitting the image data associated with every pixel from a high-resolution sensor requires a high-level of energy. For example, high-quality 3-dimensional locational data acquisition may consist of a large pixel count, and thus a large amount of image data. Transmitting such a large amount of data between an image capturing device and a display may result in large periods of latency or, if compressed in typical ways according to existing art, quality degradation of the image data (e.g., decreased resolution, decreased frame rate, decreased accuracy and the like).

In conventional systems, image capture devices (e.g., film and digital cameras, information handling devices with integrated cameras, video-camera recorders, etc.) are routinely used to capture images for many different purposes. Some image capture devices are more complex than others. For instance, a recently pioneered type of image capture system is the light-field camera. Light-field systems deploy either many combination of lenses and sensors, or multiple lenses in a two-dimensional matrix in front of a single sensor in what is a known as a plenoptic array, to capture three-dimensional information about the image in front of the lens or lenses. Typical light-field capture systems feature a microlens array in front of a sensor and one or more additional focusing lens elements stacked in front of the microlens array. Some available systems take numerous exposures at different focal distances and allow users to focus, with software, on different areas of a captured light field after the picture has been captured. Others aim to capture an autostereo 3D view of what the camera sees, but typically suffer from low apparent resolution and very noticeable diffraction and image distortion. The transmitting of the data collected by such a light-field system requires high-levels of bandwidth when transmitting the entirety of the image data obtained to a display to be viewed by one or more users.

SUMMARY OF THE INVENTION

The embodiments described herein correspond to a novel way of limiting the amount of data, energy and bandwidth used when transmitting image data to a display after a portion of a display that a user is viewing has been identified, either 1) based on a probabilistic assumption concerning which areas of a display that users' gazes are most likely to be viewing, or 2), simply based on an understanding of the maximum number of, and the general location of, pixels which may be viewed through the plenoptic lens located on the receiving display. In both of these cases, the transmitted image data may be limited and then the invention allows for a specific method of processing to reconstruct the full image such that it appears lossless to the viewer. Additionally, the embodiments described herein utilize a novel method of foveated rendering when transmitting the smaller datasets of image data.

In accordance with embodiments of the application, a method and system provide an image capturing device, or a processor at some location within a network, with information related to a user's gaze location present on a display, and to the layout of plenoptic lenses and the pixel layout of the user's display. The lens arrangement being utilized with the sensors of the image capturing device may be associated with one or more lens tiles disposed on the display. For example, in an embodiment, the lens arrangement in the system may be a single-element plenoptic lens. A plenoptic lens, or lens array, may consist of a plurality of light-directing beads, or lenslets. The plenoptic lens is placed over and focused on a sensor or array of sensors (e.g., an image sensor of an image capture device, etc.). When the processor of the image capture device, or some other processor located elsewhere in the network, directs the device to capture an image, the image is captured through the array of lenslets. Depending on the plenoptic lens utilized, each lenslet can capture an integral image that is in focus for a given range of distance from the sensor, with only this single lens element used. That range, in other words the extent from the nearest distance in which objects appear in focus to the farthest, may be extended or contracted, or placed at a given overall distance from the lens, based on optical design that involves trade-offs as will be appreciated by those versed in the art. In other words, certain plenoptic lenses utilized with the lenslet will allow the capture of multiple integral images that appear more or less in focus.

Additionally, since each lenslet captures an integral image, the user or network administrator can provide different input to identify what information should be captured and processed within an image registered by the sensor, or by some processor and data storage unit located elsewhere in the network, including most commonly but not exclusively within the edge device that incorporates the display and its associated plenoptic viewing lens, after an original image is captured. For example, an embodiment may be able to identify a user's gaze location on the display (e.g., utilizing one or more conventional gaze determination techniques, etc.). With this information, the system may correlate the location on the display associated with the user's gaze with the image data obtained by a lenslet(s) that corresponds to that location. Image data provided by that lenslet or other lenslets that do not correspond to the user's gaze location can be ignored.

Such a system may accordingly determine relationships between lenslets in the image capture array with the lens tiles disposed on the display. Also, even if no such relationship between the capture lens array and the display lens array exists, essentially the same relationship may be created between the display lens array and a processor located anywhere in the network to feed the display with image data as if it were sourced from a capture lens array in such a relationship. Additionally, even if information on the user's gaze position is unknown or imperfect, the image data supplied may be limited to a given expected gaze position which would then naturally compel the viewer to accommodate themselves to that position. Each relationship may be associated with a data point describing such a relationship by, for example, a position of the lens tile on the display in association with the lenslets which obtained the image data. The number of these data points is limited by the resolution of the sensor or sensor array used and the pixels present on the display, in addition to data points representing the (presume or actual) position of the viewer's eye, the geometry of the display lens array, and the software presenting the image on the display.

The transmission of image data associated with each data point obtained by the system when determining the location of the user's gaze may be restricted by the available bandwidth. If a large amount of data points are collected and the image capturing device attempts to provide the associated image data to the display, a system may tax the available bandwidth across the present network. Thus, determining a lesser amount of image data to be supplied over the network may be accomplished based upon the presence of redundant information provided by the lens arrangement in use. The amount of information that is provided by the lens arrangement is based upon the plenoptic lens utilized. If the plenoptic lens is able to capture everything in full focus, then the information that is provided by the lens arrangement will be full focus redundant information. If, on the other hand, the plenoptic lens does not capture everything in full focus, then the lens arrangement will provide redundant information related to the part of the image that was captured in focus; also, out-of-focus information from multiple lenslets in the array may be processed in relation to that similar information regarding the same subject matter from other lenslets in the array to create a more focused overall image.

The lens arrangement in use may provide a system with low latency combined with the high resolution, high frame rate, strong locational accuracy, and the like, that was previously determined as desirable. A lens arrangement placed over the one or more sensors associated with an image capturing device may allow for the precise localization of objects in a space. Such precise localization may utilize the data points describing the relationships mentioned previously. Additionally, the lens arrangement used may assist in the determination of the localization of objects in space (e.g., the gaze location of a user, etc.), by the use of a redundancy of information provided by the lens array. The multiple lenslets in the array may capture multiple views in space when used with the one or more sensors, or may project multiple views on the display.

Further, the redundancy of views provided by the system may allow for the triangulation, and thus the determination of position, from the object to photosites in the one or more sensors or from the object to the many pixels present in the display associated with one or more lens tiles being viewed by the one or more users, on the same point in space. However, if a position of the captured objects is known, a user's gaze location is either known or approximated, and the number of users viewing the display screen is known, then a small subset of redundant information captured may be transmitted to the display, which produces a result comparable to the transmission of the full redundant data set. In this context "approximated," means that simply by knowing the size, shape and arrangement of lens tiles on the receiver's display, as well as the size and resolution of that display, a somewhat larger than optimal but still much reduced file size may be determined for transmittal. The reduced image data would then be processed on the receiving side to construct as large and highly resolved an image as the user is capable of seeing with the given display and lens arrangement.

The system may then be able to determine potential subsequent portions of the screen that may be viewed by the determined number of viewers that view the display. As an individual's gaze may move across a display, a system may be able to track the user's gaze location and further detect potential portions of the display that contain different pixels, or potential lens tiles on the display, based upon what the user may view next. A system may then only update portions of a display where the user is looking and those areas that the system anticipates the user will look next. This concept of only updating these areas of the display and transmitting less information via smaller sets of data; thus, using less bandwidth on a network, is called foveated rendering. Foveated rendering used in combination with a lens arrangement may utilize these small sets of data when viewing a portion of the display containing a redundancy of views to decrease the amount of bandwidth needed while maintaining low latency, high quality parameters of the image data being captured and displayed.

In summary, one aspect provides a method, including; obtaining, using at least one image obtaining sensor of an image capture device, image data; tracking, using a gaze detection sensor, a user's gaze on a display of the image capture device, wherein a plurality of lens tiles are disposed on the display and wherein each of the plurality of lens tiles cover a portion of the display; predicting, using a processor and based on the tracking, a subsequent gaze location on the display that the user's gaze is expected to be directed toward, wherein the predicting the subsequent gaze location comprises: identifying another portion of the display associated with the predicted subsequent gaze location; and identifying a new set of the plurality of lens tiles that are disposed over the another portion; transmitting, using a processor, additional image data to the display associated with the portion of the plurality of lens tiles the user is currently viewing and the another portion of the display associated with the new set of the plurality of lens tiles; and updating, responsive to identifying that the user's gaze has transitioned to the subsequent gaze location and using the additional image data, the image data associated with the another portion of the display corresponding to the new set of the plurality of lens tile.

Another aspect provides an information handling device, including; an image obtaining sensor; a gaze detection sensor; a display; a plurality of lens tiles disposed on the display, wherein each of the plurality of lens tiles cover a portion of the display; a processor; a memory device that stores instructions executable by the processor to: obtain, using the image obtaining sensor, image data; track, using the gaze detection sensor, a user's gaze on the display, wherein a plurality of lens tiles are disposed on the display and wherein each of the plurality of lens tiles cover a portion of the display; predict, based on the instructions executable by the processor to track, a subsequent gaze location on the display that the user's gaze is expected to be directed toward, wherein the instructions executable by the processor to predict the subsequent gaze location comprise instructions executable by the processor to: identify another portion of the display associated with the predicted subsequent gaze location; and identify a new set of the plurality of lens tiles that are disposed over the another portion; transmit additional image data to the display associated with the portion of the plurality of lens tiles the user is currently viewing and the another portion of the display associated with the new set of the plurality of lens tiles; and update, responsive to identifying that the user's gaze has transitioned to the subsequent gaze location and using the additional image data, the image data associated with the another portion of the display corresponding to the new set of the plurality of lens tiles.

Another aspect provides a product, including: a storage device that stores code, the code being executable by a processor and comprising: code that obtains image data; code that tracks a user's gaze on a display of an image capture device, wherein a plurality of lens tiles are disposed on the display and wherein each of the plurality of lens tiles cover a portion of the display; code that predicts, based on the tracking, a subsequent gaze location on the display that the user's gaze is expected to be directed toward, wherein the code that predicts the subsequent gaze location comprises code that: identifies another portion of the display associated with the predicted subsequent gaze location; and identifies a new set of the plurality of lens tiles that are disposed over the another portion; code that transmits additional image data to the display associated with the portion of the plurality of lens tiles the user is currently viewing and the another portion of the display associated with the new set of the plurality of lens tiles; and code that updates, responsive to identifying that the user's gaze has transitioned to the subsequent gaze location and using the additional image data, the image data associated with the another portion of the display corresponding to the new set of the plurality of lens tiles.

A BRIEF DESCRIPTION OF THE DRAWINGS

FIG. 2 illustrates an example image capture device lens design.

DETAILED DESCRIPTION OF THE INVENTION

Figure 1:
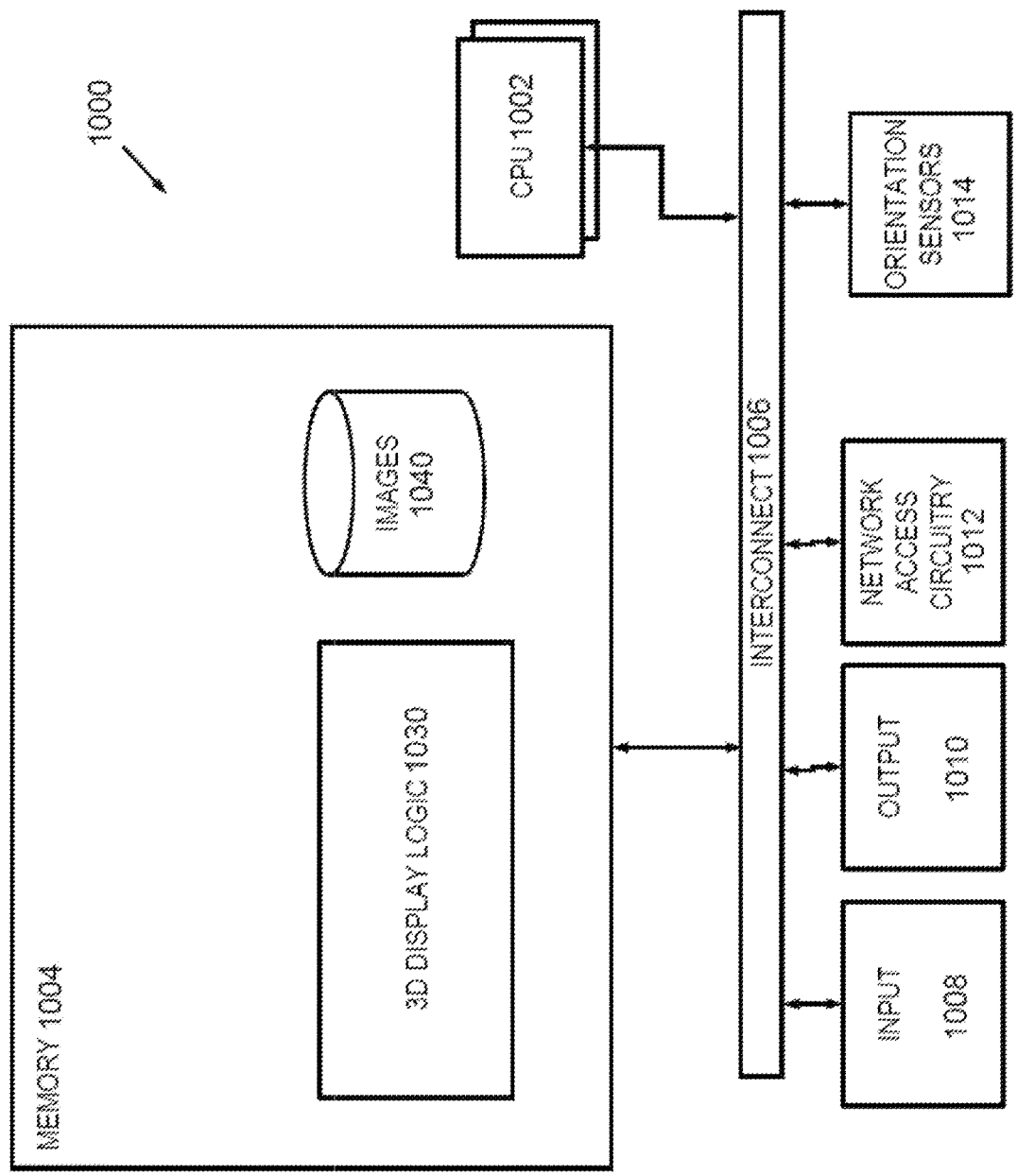
FIG. 1 illustrates a block diagram showing an example apparatus device.

In accordance with the present application, an embodiment provides a method for updating the image data on a portion of a display to provide a user viewing the display with an updated, high quality, in focus image while simultaneously decreasing the amount of image data and thus the amount of bandwidth needed to transmit the image data. Additionally, since only a portion of image data that is being viewed may be updated, an embodiment may further utilize information already present in the system, for example, the use of redundant information, to produce small datasets of image data associated with the user's gaze location on the display, and may further predict where a user may subsequently adjust their gaze location on the display. Utilizing a method of foveated rendering, an embodiment may be able to maintain a system with low latency while also maintaining a high resolution for the image data being produced on the display, a high frame rate, a strong locational accuracy of the user's gaze, and the like.

A system may utilize one or more sensors associated with an image capturing device (e.g., integrally coupled to the image capturing device, operatively coupled to the image capturing device, etc.) to provide image data to a display that one or more users may view. The one or more sensors may be, for example, a camera that will be used in combination with a lens permitting the obtaining of image data through a lens array. Throughout this specification reference to the lens-type utilized in combination with the one or more sensors may be understood to be a plenoptic lens array; however, such a designation is not limiting and any lens that, when placed over a sensor and permits the localization of objects in space, may be used.

In an embodiment, the plenoptic lens may be made up of a plurality of light-directing beads, also referred to as mini-lenses, microlenses, or lenslets. Additional details regarding the Foveal lens when used in both display and capture systems, and background information regarding the lenslets can be found in commonly owned U.S. patent application Ser. No. 16/436,343, filed Jun. 10, 2019, and titled "Near-Eye Foveal Display", which is a continuation-in-part of U.S. patent application Ser. No. 15/671,694, filed Aug. 8, 2017, and titled "Near-Eye Foveal Display", which is a continuation-in-part of U.S. patent application Ser. No. 15/594,029, filed May 12, 2017, and titled "Near-Eye Foveal Display", the contents of which are incorporated by reference herein.

The lenslets as described in the above applications each capture an integral image that is in full focus across a wide range of focal lengths. However, the described system can be utilized with other plenoptic lenses that may not capture well focused images, and will allow the resultant images to be brought into better focus or to be processed such that other important data may be extracted. Since each lenslet is small, the lens or lens array includes a multiplicity of lenslets. For example, in an embodiment used in a test system, the lenslets are approximately 3 mm square and are placed over an approximately half-inch sensor and display, yielding a total of 12 lenslets in the array used for both capture and display. Thus, the resulting lens, or arrays of lenslets, is a high-resolution lens that is not found within conventional image capture device lenses. The range of view of each lenslet may be a conical shape radiating from the lens. Since the optics of each lenslet are known, the areas of overlap between all the lenslets in the array is also known. Using this information, the system can identify a position of an object with respect to the lens, for example, an object being captured within the image. Knowing the position of the objects on X, Y, and Z axes in relation to the lens array and underlying sensor, the system is able to provide additional functions that are not possible using conventional techniques, as described further herein.

In an embodiment, the utilization of the lenslets present in the plenoptic lens array used with the one or more sensors present in an image capturing device may provide a system with the ability to locate portions of a display that a user is viewing. As mentioned previously, the overlapping of lenslets present when using a plenoptic lens array provides a collection of image data that contains redundancy of the image data. Since the overlapping of the lens causes information in one location to be captured by more than one lenslet, a redundancy of image data becomes present in the system. In an embodiment, this redundant image data may then be provided to a display. In an embodiment the display may be overlaid by a plurality of lens tiles. A system may then transmit the redundant image data to a display, and producing the redundant information across the plurality of lens tiles. In an embodiment, when displaying the redundant information, the lens tiles may be lit up by the pixels associated with each lens tile. The pixel density of the display and the amount of lens tiles overlaid on a display may determine the amount of image data that may be displayed on a display. For example, the relationship between the number of pixels per lens tile may limit the amount of redundant image data that may be displayed, even if the sensor utilizing a plenoptic lens arrangement may capture a greater amount of image data.

An embodiment may use the redundant information presented on the display when determining the location of a user's gaze when viewing the display. Being that redundant information is the repetition of the same information across the same display, a user may only need to view a portion of the display to see a whole, full focus image that was captured by the image capturing device. Also, in an embodiment, given that only a subset of all the image data captured may be so required by the display, that subset may be processed in such a way to bring the displayed image into better focus, which is achieved as a result of triangulating from multiple lenslets' views of objects captured. In an embodiment, tracking the user's gaze may consist of triangulating user characteristics with the portions of the display that a user is viewing. For example, in an embodiment, when the user is viewing a portion of the display that consists of a portion of the redundant information captured by a sensor paired with an array, the user may view an entire image when only viewing lens tiles or when viewing the pixels associated with the portion of the redundant information being displayed. The location data associated with the lens tiles or the pixels being viewed may be obtained via a sensor coupled to the image capturing device and provided back to a processor within the system to trace this determined location of the user's gaze. In an embodiment, the user characteristic being tracked by the system may be a user's pupils. Being that a user's pupils indicate the most direct line of sight of a user, tracking the position of the user's pupils and further determining the portion of the display that a user is viewing may further assist in determining an amount of image data necessary to transmit an entire, full focus image.

The geometry of the lens and the display, and the relationship between them, may be fed from the display back to the sensor containing the lens array. Additionally, the determined location of the user's pupils may also be fed back from the display to a processor associated with the camera in order to further determine the image data to be captured. The information being collected from the display by the camera and further utilized by the camera may determine the portion of a display being viewed; thus, a system needs a decreased amount of image data while continually providing an entire, full focus image. A system may utilize a tracked user characteristic along with the known geometries of the display, and by use of an image capturing device in combination with a plenoptic lens, to determine an amount of pixels being viewed by the user on a display.

This decreased amount of image data provides a system with the ability to transmit a portion of the image data (e.g., a portion comprising one portion of the redundant information, etc.) to the display while maintaining a whole, full focus image. In an embodiment, the transmitting of a portion of the image data containing a full image is known as foveated rendering. In an embodiment, the capture of multiple images with a lens array is known as a synthetic aperture phased array. Foveated rendering may occur in a processor located anywhere in the network, including within the capture device, the display device, or elsewhere. As previously discussed, since a plenoptic lens provides an overlapping of lenslets and creates a redundancy of image data being viewed through multiple lenslets, in order to see a whole, full focus image a system may remove image data that would otherwise be viewed multiple times or has become redundant or that can be determined as out-of-focus after comparison of triangulated object edge data from two or more lenses in the array. The removal of the excess information, and/or the creation of new information after processing triangulated images from multiple lenslets, may decrease the amount of image data that needs to be transmitted while maintaining a view of the entire image captured. Correspondingly, this type of synthetic aperture system utilizes less bandwidth while transmitting image data and also simultaneously maintains a low latency and high-resolution imaging. In an embodiment, the transmission of this lesser amount of image data associated with a portion of the redundant image data obtained may be supplied to the display device in a smaller dataset in comparison to the size of the dataset that would include all the image data captured. In an embodiment, this smaller dataset transmission maintains the low latency and high-resolution imagery because a lesser amount of bandwidth is needed to transmit such a small dataset.

It is very unlikely that a user will solely focus on a single portion of a display for an extended period of time unless the field of view that the display presents to the eye is relatively small. More particularly, it is typical of human users to shift their gaze rapidly across a display or around a physical environment. For example, curiosity drives a user to shift perspective when viewing a display or looking around a room. In an embodiment, a system may be able to determine the pixels that need to be lit or provided with new information to accommodate where the user is currently viewing; however, the likelihood of the user adjusting where they are looking happens quickly and the lighting of the pixels associated with a user's gaze may not provide a desired full focus image to the user when they switch their attention to another portion of the display. It should be noted that in some applications some redundant pixels may be darkened, whereas, in other applications, redundant pixels will just not be updated upon a refresh cycle. The described system and method can work with any of these applications.

In an embodiment, a system may predict a portion of the display toward which a user may adjust their gaze to, based upon where movement, changed colors or brightness, or other new information is presented. In an embodiment, this prediction may be facilitated by recognizing digital objects presented on a display or physical objects present within a space containing the user. Recognition of the foregoing object types may be facilitated by one or more sensors associated with the image capturing device. As a non-limiting example of the foregoing concepts, a user viewing a display may be viewing a scene comprising multiple people. A user's gaze may be determined to be concentrating on a portion of the display containing a character that is speaking. A system may then be aware that at a point while the character is speaking, a bird may fly in along the top of the display. If a user does not diverge from the location they are currently viewing the user may still view the bird fly in; however, as a natural reaction the user may change their perspective towards a portion of the display along the top of the display. In this example, the bird may be the recognized object that may cause the user to change their perspective. In an embodiment, in order to account for the recognition of objects in a scene that may adjust perspective, or as a way to account for when a user's attention shifts across a display, an embodiment may provide additional portions of the redundant image data collected by the sensor to account for the adjustment of user perspective as related to the display. In an embodiment, such transmission of additional portions of redundant image data will still be less image data than transmitting all of the image data obtained. In an embodiment, transmitting the additional portions of image data associated with the predicted portions a user may subsequently view may occur at the same time as the providing the image data to the portion of the display that the user is viewing. In an embodiment, transmitting the additional portions of the redundant image data may occur on a delay, but may not affect the quality of the image data.

In order to accurately recognize one or more objects within a space, the sensors operatively coupled to the camera may provide to a processor associated with a display image data comprising geometries of the one or more sensors being used and the lens-type. In an embodiment, such a relationship between the one or more sensors being used and the lens may provide an amount of redundant information for potential displaying. An amount of redundant information may provide additional views of an image when being displayed.

Further, the sensors operatively coupled to the camera may provide to a processor associated with a display image data with objects shapes and types that may be recognized. In an embodiment, the objects being recognized may be people. In an embodiment, the objects being recognized may be animals. In an embodiment, the objects being recognized may be inanimate objects. Additionally, in an embodiment, past and projected object movement may be accessed to predict further object movement, for example, the bird flying in along the top of the view. This movement data may be provided as vector data which may be translated into pixel data at the control apparatus. In an embodiment, past and projected camera movement may be provided to the display as vector data which may also be translated into pixels in the control apparatus.

In an embodiment, the information being sent between the sensors operatively coupled to an image capturing device and a display used for displaying the image data may be transmitted to a central computer control apparatus, which may then forward relevant information to the one or more sensors or to the display. Information may be collected and then analyzed and augmented in the central computer control apparatus to process and create other information of its own which may then be sent to the sensor or display, respectively. In an embodiment, the information produced by the central computer control apparatus may include the objects recognized in a space. In an embodiment, the information produced by the central computer control apparatus may be a sensor determination that may be viewing a scene. This is particularly present in multi-sensor situations. In an embodiment, the information produced by the central computer control apparatus may include the determination of how many users may be viewing a display, and the tracking of one or more viewers viewing a system. In an embodiment, the central computer control apparatus may create a point cloud to construct information sets based upon receiving information from each component of the system. An embodiment may include a point cloud consisting of all recognized objects within a space, one or more sensors capturing image data, and if one or more viewers are viewing a display. The collection of data from each system component may provide the central computer control apparatus with the information necessary to determine the size of the dataset containing the redundant image data to be supplied to a display when the determined number of users are viewing one or more portions of a display.

In an embodiment, the inherent redundancy allowed by the plenoptic lens shape used for both cameras and displays throughout the network also enables relatively lossless signal compression even in situation with significant dataset loss or information lost within datasets or frames. Further, in an embodiment, as the central computer assembles a point cloud model of all information in a scene captured by multiple cameras, added to which model are its own synthesized understanding of object, shapes and movements of those objects and shapes, then it can supply a synthesized understanding of image information where network data loss my limit visual information from a given source, thus creating or maintaining high visual quality for the displays in the network even when not supplied with good image quality from one or more of the networked cameras.

Referring to FIG. 1, a device 1000, for example, that which is used for the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a keyboard, a keypad, a touch-sensitive screen, a mouse, and a microphone. An embodiment may include an input device such as a camera or photosensor used for eye-tracking. Eye tracking that is then associated with computer-activation of particularly chosen pixels is a typical implementation of the invention when used in a near-eye display and other embodiments, as volumetric capture makes for more accurate tracking of eye movements. Output devices 1010 can include a display—such as an OLED (organic light-emitting diode), a microLED, or liquid crystal display (LCD), or a printed image of sufficiently high resolution—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user. Additional details regarding using multiple cameras and using triangulation to create 3D imagery can be found in commonly owned U.S. Pat. No. 9,736,462, issued on Aug. 15, 2017, and titled "Three-Dimensional Video Production System", the contents of which are incorporated by reference herein. With reference to this application, the system described herein can use multiple cameras with Foveal lens systems to triangulate with an infinite number of potential data points among the multiple cameras.

Information handling device circuitry, as for example outlined in FIG. 1, may be used in image capture devices such as video cameras, digital still-image cameras, analog cameras, or other cameras having lenses, or devices that may be utilized to process images such as tablets, smart phones, personal computer devices generally, and/or other electronic devices.

FIG. 2 illustrates an example method for updating image data associated with a new portion of lens tiles or pixels based upon the viewing of a subsequent position on the display. Such a method may permit the use of foveated rendering in a system, and thus, include transmitting a smaller dataset of image data across a network, maintaining low latency and a high-quality imagery.

At 201, a system may obtain image data by use of one or more sensors operatively coupled to a system. In an embodiment, the one or more sensors may utilize a plenoptic lens type when obtaining the image data. Utilizing such a lens-type in combination with the one or more sensors may provide a system with the ability collect the necessary redundant information being displayed. As mentioned previously, the presence of the collected redundant information may be utilized when providing information from the display to the one or more sensors through the central computer control apparatus. For example, in an embodiment, supplying such information may assist a system in tracking a user's gaze, and thus supplying the location of a display containing a portion of the image data that a user is concentrating on. Further, in an embodiment, the obtaining of image data 201 provides the image data that may be updated while being viewed on display.

After obtaining the necessary image data 201, a system may be dispose a plurality of lens tiles on the display comprising the image data. In an embodiment, a display being viewed or may be viewed may contain a plurality of lens tiles across the display. Such tiles may be associated with the redundant information obtained by the one or more sensors with the plenoptic lens. The relationship between the redundant image data collected and the viewing of a portion of the display at a moment may assist in providing a smaller dataset of data over a network but determining the portion of the display being viewed by associating the lens tiles being viewed with the obtained image data.

A system may then be tracking a user's gaze on the display 202. As mentioned previously, such tracking may be performed by a system providing information from the display to the one or more sensors in use. The triangulation of a user's gaze, based upon the lens tiles or a portion of the pixels being viewed on a display, may be collected and fed back into a system when determining that image data to be transmitted over the network.

Based upon the information regarding the location of the user's gaze on the display, a system may predict a subsequent area on the display that a user will view 203. In an embodiment, the predicting the subsequent area on the display that a user may view may be because of the recognition of an object in space. In an embodiment, the predicting the subsequent area that a user may view may be because of past recognition of an adjustment to the user's perspective of the display. In an embodiment, the predicting of where a user's subsequent view may be located is predicted by collecting object related information and past object movement data that may then be used to predict where a user may adjust their perspective to view a new portion of the display.

After predicting that the potential subsequent viewing areas on a display for a user 203, a system may be transmitting additional image data to the display associated with the portion of the plurality of lens tiles the user is currently viewing and the new portion of the plurality of lens tiles the user may subsequently view 204. In an embodiment, the transmitting of such data may include transmitting more than one portion of redundant information simultaneously to a system to account for the portion of the display being viewed and the potential subsequent areas while maintaining low latency and high-quality of the image data obtained. In an embodiment, as mentioned previously, the supplying of a single portion of the redundant information collected may maintain high quality image while also maintaining a low latency across a network because of the decreased size of the dataset containing such image data being transmitted across a network. The bandwidth needed to transmit a small dataset is much less than is needed when transmitting a dataset containing all of the redundant views of the obtained image data. Thus, in an embodiment, the accounting for subsequent locations of a display that may be viewed by the user and including the image data associated with the potential subsequent portions of the display to be viewed is still transmitting a small dataset that contains much less captured image data than supplying all of the obtained image data. This maintains the low latency and smaller bandwidth while maintaining high-quality image data that is desired by the system.

The system may then be updating the image data associated with the new portion of the plurality of lens tiles 205. When it is determined that a user's gaze does transition to a new portion of the display, the additional image data that was transmitted in 204 for the subsequent views may be utilized to ascertain that a user may not lose quality of the image being displayed. This updating of a portion of the display based on what a user is viewing is known as foveated rendering. A system may continually update the image data 205 while a user is viewing the determined portion of the display by use of transmitting a small dataset of image data across the network. The use of foveated rendering permits a system to continuously work without interruption. A system may continually update the image data associated with the new portion of the plurality of lens tiles 205 for however long the user's gaze is determined to be in the same location. Once a subsequent view may be viewed by the user, that subsequent view may become the new current view of the user and the system may perform steps 203-205 to determine where a user's perspective may transition to next.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method, comprising;
obtaining, using at least one image obtaining sensor of an image capture device, image data, wherein the image obtaining sensor comprises a camera having a plenoptic lens arrangement;
tracking, using a gaze detection sensor, a user's gaze on a display of the image capture device, wherein a plurality of lens tiles are disposed on the display and wherein each of the plurality of lens tiles cover a portion of the display, wherein the portion of the plurality of lens tiles that the user's gaze is directed toward provides a full focus image of the whole image obtained by the image obtaining sensor;

predicting, using a processor and based on the tracking, a subsequent gaze location on the display that the user's gaze is expected to be directed toward, wherein the predicting the subsequent gaze location comprises:
identifying another portion of the display associated with the predicted subsequent gaze location; and
identifying a new set of the plurality of lens tiles that are disposed over the another portion;
transmitting, using a processor and based upon an amount of bandwidth present, additional image data to the display associated with the portion of the plurality of lens tiles the user is currently viewing and the another portion of the display associated with the new set of the plurality of lens tiles, wherein the additional image data comprises a portion of redundant image data providing the full focus image of the whole image obtained by the camera having the plenoptic lens arrangement; and
updating, responsive to identifying that the user's gaze has transitioned to the subsequent gaze location and using the additional image data, the image data associated with the another portion of the display corresponding to the new set of the plurality of lens tiles, wherein the updating the image data associated with the another portion of the display comprises utilizing foveated rendering, wherein the foveated rendering comprises maintaining a high resolution for the additional image data associated with the another portion of the display corresponding to the new set of the plurality of lens tiles.

2. The method of claim 1, wherein the obtaining the image data comprises removing redundant image data, wherein the redundant image data corresponds to identical image data generated by two or more plenoptic lenses in the plenoptic lens arrangement.

3. The method of claim 1, wherein the image obtaining sensor comprises a camera with a single-element holographic or light-field lens arrangement.

4. The method of claim 1, wherein the tracking comprises identifying the portion of the display that the user's gaze is directed toward.

5. The method of claim 1, wherein the tracking the user's gaze comprises determining a pupil position for each of the user.

6. The method of claim 1, wherein the transmitting the portion of the image data comprises withholding an entirety of the image data obtained.

7. The method of claim 1, wherein the updating the image data associated with the plurality of tiles comprises updating the image data on the portion of the plurality of lens tiles on the display.

8. The method of claim 1, further comprising:
creating, using a processor, a point cloud for all information collected;
wherein the point cloud identifies relationships between the image data obtained and characteristics associated with one or more user's viewing a system.

9. An information handling device, comprising;
an image obtaining sensor;
a gaze detection sensor;
a display;
a plurality of lens tiles disposed on the display, wherein each of the plurality of lens tiles cover a portion of the display;
a processor;
a memory device that stores instructions executable by the processor to:
obtain, using the image obtaining sensor, image data, wherein the image obtaining sensor comprises a camera having a plenoptic lens arrangement;
track, using the gaze detection sensor, a user's gaze on the display, wherein a plurality of lens tiles are disposed on the display and wherein each of the plurality of lens tiles cover a portion of the display, wherein the portion of the plurality of lens tiles that the user's gaze is directed toward provides a full focus image of the whole image obtained by the image obtaining sensor;
predict, based on the instructions executable by the processor to track, a subsequent gaze location on the display that the user's gaze is expected to be directed toward, wherein the instructions executable by the processor to predict the subsequent gaze location comprise instructions executable by the processor to:
identify another portion of the display associated with the predicted subsequent gaze location; and
identify a new set of the plurality of lens tiles that are disposed over the another portion;
transmit, based upon an amount of bandwidth present, additional image data to the display associated with the portion of the plurality of lens tiles the user is currently viewing and the another portion of the display associated with the new set of the plurality of lens tiles, wherein the additional image data comprises a portion of redundant image data providing the full focus image of the whole image obtained by the camera having the plenoptic lens arrangement; and
update, responsive to identifying that the user's gaze has transitioned to the subsequent gaze location and using the additional image data, the image data associated with the another portion of the display corresponding to the new set of the plurality of lens tiles, wherein to update the image data associated with the another portion of the display comprises utilizing foveated rendering, wherein the foveated rendering comprises maintaining a high resolution for the additional image data associated with the another portion of the display corresponding to the new set of the plurality of lens tiles.

10. The information handling device of claim 9, wherein the instructions executable by the processor to obtain the image data comprise instructions executable by the processor to remove redundant image data, wherein the redundant image data corresponds to identical image data generated by two or more plenoptic lenses in the plenoptic lens arrangement.

11. The information handling device of claim 9, wherein the image obtaining sensor comprises a camera with a single-element holographic lens arrangement.

12. The information handling device of claim 9, wherein the instructions executable by the processor to track comprise instructions executable by the processor to identify the portion of the display that the user's gaze is directed toward.

13. The information handling device of claim 9, wherein instructions executable by the processor to transmit the portion of the image data comprise instructions executable by the processor to withhold an entirety of the image data obtained.

14. The information handling device of claim 9, wherein the instructions executable by the processor to update the image data associated with the plurality of tiles comprise instructions executable by the processor to update the image data on the portion of the plurality of lens tiles on the display.

15. The information handling device of claim 9, wherein the instructions are further executable by the processor to:
create a point cloud for all information collected;
wherein the point cloud identifies relationships between the image data obtained and characteristics associated with one or more user's viewing a system.

16. A product, comprising:
a storage device that stores code, the code being executable by a processor and comprising:
code that obtains image data;
code that tracks a user's gaze on a display of an image capture device, wherein a plurality of lens tiles are disposed on the display and wherein each of the plurality of lens tiles cover a portion of the display, wherein the portion of the plurality of lens tiles that the user's gaze is directed toward provides a full focus image of the whole image obtained by the image obtaining sensor;
code that predicts, based on the tracking, a subsequent gaze location on the display that the user's gaze is expected to be directed toward, wherein the code that predicts the subsequent gaze location comprises code that:
identifies another portion of the display associated with the predicted subsequent gaze location; and
identifies a new set of the plurality of lens tiles that are disposed over the another portion;
code that transmits, based upon an amount of bandwidth present, additional image data to the display associated with the portion of the plurality of lens tiles the user is currently viewing and the another portion of the display associated with the new set of the plurality of lens tiles, wherein the additional image data comprises a portion of redundant image data providing the full focus image of the whole image obtained by the camera having the plenoptic lens arrangement; and
code that updates, responsive to identifying that the user's gaze has transitioned to the subsequent gaze location and using the additional image data, the image data associated with the another portion of the display corresponding to the new set of the plurality of lens tiles, wherein the code that updates the image data associated with the another portion of the display comprises utilizing foveated rendering, wherein the foveated rendering comprises maintaining a high resolution for the additional image data associated with the another portion of the display corresponding to the new set of the plurality of lens tiles.

* * * * *